Jan. 21, 1964  J. E. LYNAM  3,118,803
APPARATUS FOR THE PRODUCTION OF COMPOSITE ELASTIC BANDING
Filed April 18, 1960  3 Sheets-Sheet 1

Inventor
JOHN EDWARD LYNAM
By Toulmin & Toulmin
Attorneys

Jan. 21, 1964  J. E. LYNAM  3,118,803
APPARATUS FOR THE PRODUCTION OF COMPOSITE ELASTIC BANDING
Filed April 18, 1960  3 Sheets-Sheet 2

Inventor
JOHN EDWARD LYNAM
By Toulmin & Toulmin
Attorneys

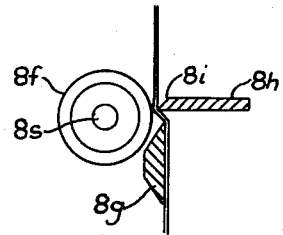
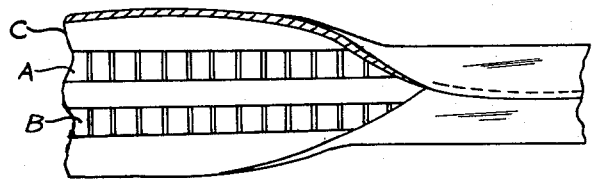
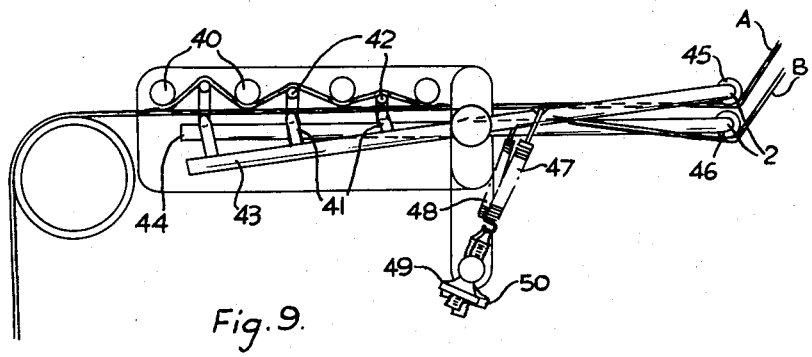
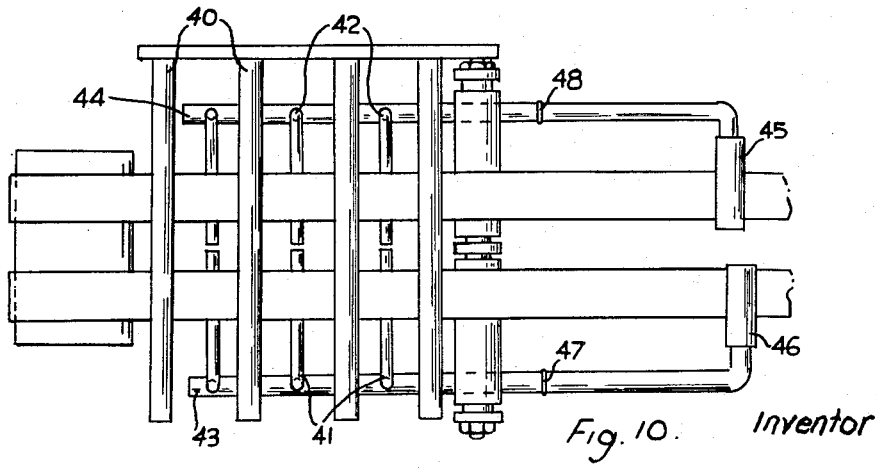

United States Patent Office 3,118,803
Patented Jan. 21, 1964

3,118,803
APPARATUS FOR THE PRODUCTION OF COMPOSITE ELASTIC BANDING
John Edward Lynam, Mapperly, Nottingham, England, assignor to Automatic Braiding Company (Nottingham) Limited
Filed Apr. 18, 1960, Ser. No. 22,861
5 Claims. (Cl. 156—438)

This invention relates to improved apparatus for the production of composite elastic banding in which a core of at least one pre-stretched ribbon of elastic (rubber, natural, or synthetic) is wholly or partly enclosed in and stuck to a folded-over textile covering strip. Primarily the invention concerns this apparatus for the production of the improved composite elastic band disclosed in the specification of our co-pending patent application No. 19,936/58 which is characterised in that the sticking is effected over a substantial part of the width of and at regions closely spaced lengthwise of the banding, and the folded-over covering strip is tensioned in its widthwise direction, and is puckered or compressed in its lengthwise direction, by the core when in relaxed condition.

An object of the invention is to provide improved apparatus for producing said banding or said improved banding.

The invention provides apparatus for the production of composite elastic banding comprising means for causing the travel in a predetermined path of textile covering strip material, means for stretching a core of at least one ribbon of elastic and applying it in stretched form facewise on to the covering strip, means for folding the margins of the covering strip over the core, and adhesive applying means adapted for the intermittent application of adhesive appropriately to stick the core in its stretched form and the covering together at frequent lengthwise intervals before relaxing the core.

For the purpose of applying the adhesive, primarily for the composite elastic banding of said specification the adhesive-applying means conveniently includes a tappet member which is of appropriate width and is operable by suitable operating means to intermittently tap the core against an adhesive-coated roller. A stationary member is also conveniently provided to cause temporary kinking of the core as it engages the adhesive-coated roller. Conveniently said member and roller form part of a unit which also includes a reservoir into which an adhesive picking-up roller dips, operating means for rotating the adhesive-coated roller in engagement with the adhesive picking-up roller, and an associated level indicator.

Desirably both faces of the ribbon of elastic are similarly treated with adhesive and for this purpose there are two of the adhesive-applying units adapted to act on opposite faces of the core respectively.

In addition there may be a third adhesive-applying unit which is similar to the other units in respect of the reservoir and rollers but which, instead of having an intermittently operating member, has a rotatable disc adapted for applying the adhesive to a marginal edge of the covering strip in instances where this edge is required to overlap the other edge when the margins are folded over.

Conveniently also the core is prevented from undesired lateral wandering by its travel and that of the composite band being not only through the nips of the nip roller units but also partly around the first rollers of these units.

For positively effecting the folding-over of the covering strip margins, there may be a roller over which the core and the covering strip travel angularly at a location between the locations of applying the adhesive where the covering strip is in unfolded state and the draw-off of the completed composite banding.

This folding may be controlled for accuracy by guide means acting on the marginal edges and on being-formed edge folds of the covering strip.

Conveniently there are spaced feed and draw-off nip-roller units, the feed unit controlling feed of the core and the draw-off unit drawing-off the composite banding with the core stretched, the covering strip being fed between the two units, and a light tensioning device for the covering strip causing it to have less stretch than that of the core.

The core may consist of more than one ribbon of elastic in spaced side by side relationship, with independently operable tension control means of each ribbon, and adhesive applying means common to both ribbons.

The invention also provides means for covering a stretched core of at least one ribbon of elastic by causing it to travel in stretched condition face-wise on a travelling covering strip and folding margins of the covering strip over the core, which means include feed means for the core and draw-off means for the covered core whereof there is at least one nip-roller feed unit for the core, which unit is so disposed that the core passes through the nip after passing partly around the first roller of the unit. The draw-off means may consist of a second nip-roller unit so disposed that the covered core passes through the nip of this unit after passing partly around the first roller of this unit.

The invention further provides means for folding margins of a textile covering strip over a core of at least one ribbon of elastic comprising a roller disposed in such position between feed means and draw-off means that the core and covering strip pass over it angularly, preferably with guide means disposed laterally of said roller to assist in accurate folding.

The above and other features set out in the appended claims are incorporated in the construction which will now be described as a specific embodiment with reference to the accompanying drawings in which:

FIGURE 6 is an enlarged detail of glue applying means;

FIGURE 7 is an enlarged detail of folding means;

FIGURE 8 is a detail plan view of the strip material being folded;

FIGURE 9 is a side detail view of rubber strip control mechanism;

FIGURE 10 is a plan view of FIGURE 9.

Figure 1:
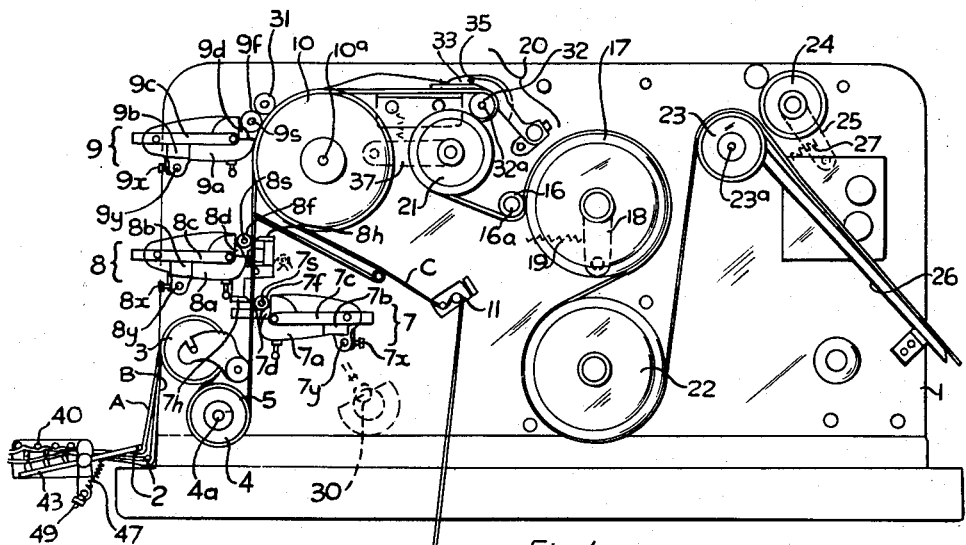
FIGURE 1 is a front view of apparatus according to the invention.

Referring now to FIGURE 1 the apparatus comprises a support 1 on which there is mounted various wheels or rollers about which elastic ribbons and textile covering travel in predetermined paths to be formed into composite elastic banding.

In this example there are two elastic ribbons A and B which, after passing under guide rods 2, pass over the first roller 3 (side by side) of a pair of nip rollers, then through the nip, and then under the second roller 4 (on a spindle 4a) of the nip rollers. The first roller 3 is conveniently mounted on a slotted arm 5 and is gravity biased to close the nip. The surface of the roller 4 may be roughened.

From the roller 4 the elastic ribbons pass upwardly past a gluing unit indicated generally at 7, and from this gluing unit 7 the elastic ribbons pass further upwardly past a second gluing unit indicated generally at 8.

The elastic ribbons then pass further upwardly past a third gluing unit indicated generally at 9, and also partly around a large diameter wheel 10 (on a spindle 10a) which changes the path of the ribbons to horizontal.

Figure 2:
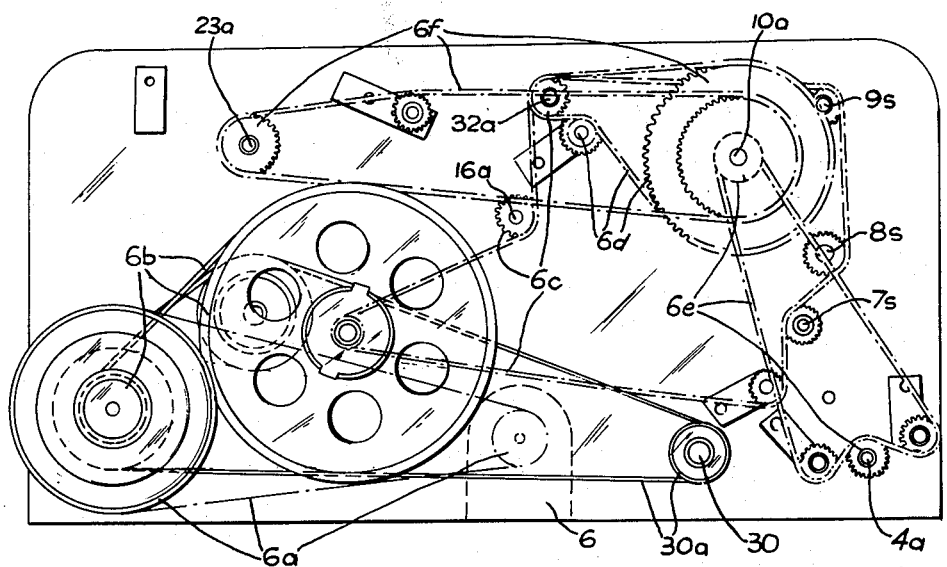
FIGURE 2 is a rear view of the apparatus.

A driving motor 6 is indicated in FIGURE 2 from which the roller 4 and wheel 10 are power driven through belt and pulley means 6a, belt and pulley means 6b, and chain and sprocket means 6c, 6d and 6e, the latter driving the spindles 4a, 10a.

The wheel 10 also has passing around it and under the elastic ribbons, a textile covering strip C which is broader than the overall breadth of the elastic ribbons sufficient to enable the margins of the covering strip to be folded over the elastic ribbons and overlap (for example as indicated in FIGURE 8 or with the overlap at any other location) or abut, or with a gap between them.

The textile covering strip passes to said wheel 10 from a light tensioning device indicated generally at 11.

The elastic ribbons are under strong tension (e.g., 100% in length) and for this purpose draw-off nip rollers 16, 17 have a greater peripheral speed than the feed nip rollers 3, 4.

The covered elastic strips pass about the first roller 16 (which may be roughened if desired) of the nip rollers 16, 17 before passing through the nip, and from the nip the covered elastic strips pass about the second roller 17.

Said large draw-off roller 17 is conveniently mounted on a pivoted arm 18 and biased by spring means 19 in a direction closing the nip.

The other draw-off roller 16 (on a spindle 16a) is power driven from said motor 6, through said belt and pulley and chain and sprocket means 6a, 6b and 6c which drives the spindle 16a.

Between the wheel 10 and draw-off rollers 16, 17 the covering strip is folded about the elastic ribbons by folding means indicated generally at 20. Since adhesive has been applied by units 7 and 8 to the elastic ribbon, and by unit 9 to one edge of the strip, the composite elastic banding is thus formed, and in order to consolidate the parts in the folded condition the banding passes between the roller 32 and a large roller 21 on its way from the folding means 20 to the draw-off rollers 16, 17, the roller 21 being conveniently carried by an arm 37 and being spring biased towards the roller 32.

From the draw-off rollers 16, 17 the banding passes around a large wheel 22 to allow further drying time and from which it passes between guiding rollers 23, 24. The guide roller 24 is conveniently mounted on a pivoted arm 25 biased by spring means 27 in a nip closing direction. The guide roller 23 is driven by said motor 6 through said belt and pulley means 6a, 6b, said chain and sprocket means 6c, 6d and through chain and sprocket means 6f, the latter driving the spindle 23a. From the rollers 23, 24 the band travels away from the machine down an inclined guide 26.

Figure 3:
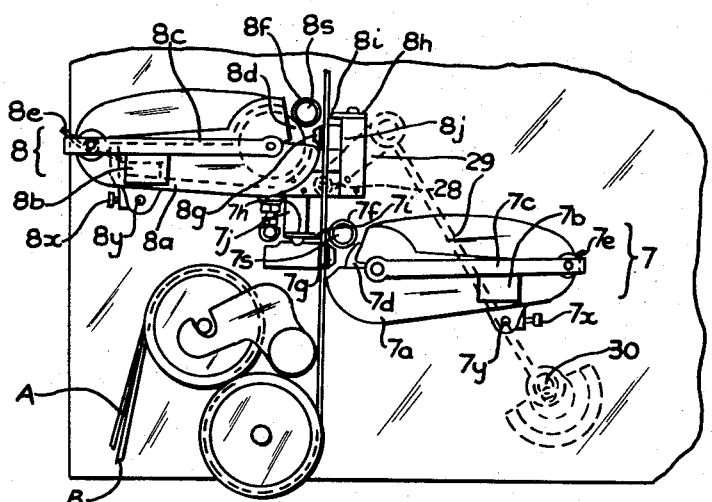
FIGURE 3 is an enlarged detail of gluing means in the apparatus.
Figure 4:
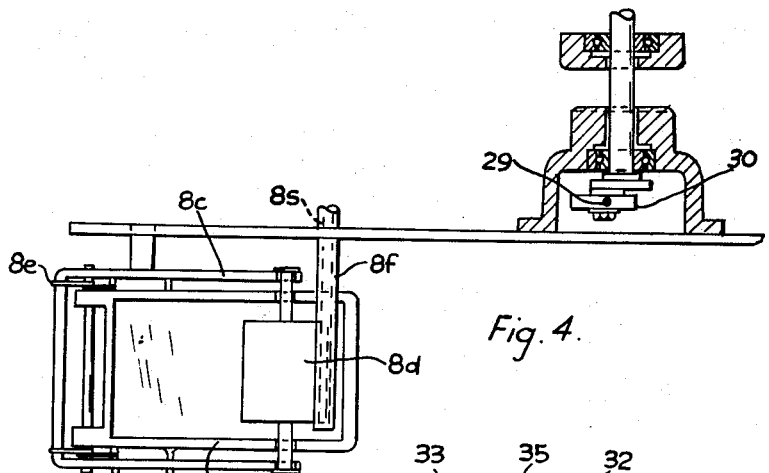
FIGURE 4 is a plan view of part of FIGURE 3.

The gluing units 7, 8, 9 have tray-like receptacles 7a, 8a, 9a (FIGURE 1 and also see FIGURES 3 and 4) with a base inclining down towards the elastic ribbons (and adjustable by screws 7x, 8x, 9x bearing on fixed bosses 7y, 8y, 9y), small auxiliary tray-like branches 7b, 8b, 9b from the shallow end forming a filling mouth and level indicator, a pivoted cap and stirrup 7c, 8c, 9c, adhesive pick-up rollers 7d, 8d, 9d carried by the stirrup under control of springs 7e, 8e, and dipping into the deep end of the receptacles, and adhesive applying rollers 7f, 8f, 9f (on spindles 7s, 8s, 9s, FIGURE 2) which are power driven, in peripheral contact with the adhesive picking up roller (as biased by the springs 7e, 8e) and slightly spaced from the elastic ribbons, by said motor 6 through said chain and sprocket means 6c.

The units 7 and 8 are disposed to apply glue to opposite faces of the elastic ribbons.

The units 7, 8 have associated with them (FIGURE 3) stationary vertical guide plates 7g, 8g (8g shown more clearly in FIGURE 6) with upper bevelled edges, as shown adjacently under the respective adhesive applying rollers 7f, 8f and close to the opposite sides respectively of the elastic ribbons. Tappet plates 7h, 8h are provided as shown opposed to the respective adhesive applying rollers 7f, 8f and on those sides of the elastic ribbons opposite to the respective adhesive applying rollers. These tappet plates 7h, 8h are disposed horizontally with bevelled edges 7i, 8i directed towards the elastic ribbons at a level almost immediately above the respective stationary guide plates, and mountings 7j, 8j are provided for the tappet plates.

These two mountings 7j, 8j are carried on a common oscillator shaft 28 which is power driven through connecting means 29 from a shaft 30 driven by said motor 6 through belt and pulley means 30a.

The two tappet plates 7h, 8h are of any width within the width of the elastic ribbons according to the breadth of adhesive required across the ribbons, and the adhesive is applied by the units 7, 8 on the opposite face of the ribbons, not in the more usual way of displacing a glue-picking up element into contact with the work, but by displacing the elastic ribbons against the glue-picking up element. More specifically the tappet plates 7h, 8h are intermittently displaced in opposite direction by the oscillator shaft 28 to intermittently form a temporary kink in the elastic ribbons in each opposite direction due to the pressure of the bevel plates 7g, 8g (see FIGURE 6 for plate 8h), which kinks of the ribbons are pressed by the tappet plate against the associated adhesive applying rollers 7f, 8f after which the kinks are straightened by the tension on the ribbon. The intermittent gluing results in the adhesive being applied to the opposite faces of the ribbons in longitudinally spaced transverse stripes and the cross sectional depth of such stripes of adhesive being particularly pronounced.

The transverse stripes on the one face of the elastic ribbons serve to stick the ribbons and the rear layer of the folded-over covering strip together whilst those on the other face serve to stick the elastic ribbons and the front margins of the covering strip together.

In addition, assuming it to be required for an edge portion of one margin of the covering strip to overlap the other edge portion, the gluing unit 9 applies, by means of a disc 31 (FIGURE 1), in contact with the adhesive applying roller 9f, a stripe of adhesive longitudinally along that edge portion which is to be turned over onto the other edge portion.

Figure 5:
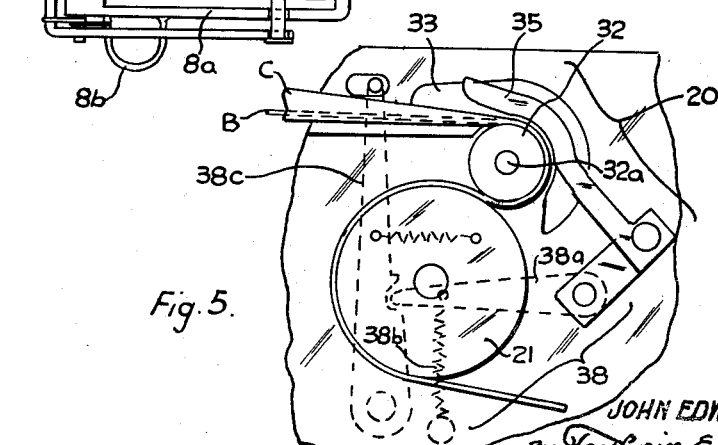
FIGURE 5 is an enlarged detail of part of folding mechanism.

The folding of the covering strip about the elastic ribbons is effected principally by its travel around a roller 32 (on a spindle 32a, FIGURES 1, 2 and 5) which is power driven (from said motor 6 through said chain and sprocket means 6c) and is in peripheral association with wheel 21, it being understood that after the machine has been set up with the margins of the covering strip folded over the elastic ribbons at the draw-off side of roller 32 the merging will continue to be folded over automatically by their travel around this roller 32 progressively in the form shown in FIGURE 8. However to ensure desired accuracy of folding in required relation to the elastic ribbons, there are side walls 33, 34 (FIGURES 1 and 5 for wall 33, FIGURE 7 for both walls), at opposite sides of the folded covering strip to guide the edge folds and bevel edged light-pressured finger elements 35, 36 bearing on the folded over margins of the covering strip to guide them downwardly.

A releasable catch device indicated generally at 38 is provided for releasable holding of the fingers 35, 36 in position. The catch device 38 conveniently comprises (FIGURE 5) a trip arm 38a biased by a spring 38b to urge the fingers 35, 36 against the work, and a manually displaceable detent arm 38c. Thus the fingers 35, 36 can be lifted and held clear by the detent for setting up the work, and can be re-set upon manual displacement of the detent.

It is to be noted that wherever there are nip rollers, the elastic ribbons (with or without the covering strip) pass partly around the first pair of rollers of the two pairs of nip rollers to ensure against lateral wandering of the ribbons. In the instance of at least the feed rollers 3, 4, the elastic ribbons also pass partly about the second pair of nip rollers for frictional grip so that the nip pressure need not be excessive.

For tension control of the elastic ribbons they both pass under spaced rods 40 (FIGURES 9 and 10) and each passes over its own spaced fingers 41, 42, which are carried by their own levers 43, 44, whereof end rollers 45, 46 bear on the ribbons, and springs 47, 48 which have adjusting screws 49, 50 urge the rollers 45, 46 downwardly and the fingers 41, 42 upwardly so that the tension is automatically maintained substantially constant.

If desired one elastic ribbon may be tensioned to a greater extent than the other such for example as by passing it over an additional guide before reaching the rollers 3, 4, or by suitable adjustment of screws 49. 50.

What I claim is:

1. Apparatus for the production of composite elastic banding comprising in combination, means for continuously feeding a tensioned elastic core in an upward direction, means for continuously feeding a textile covering strip in flat form behind said tensioned elastic core and folded about said tensioned elastic core, and adhesive applying means for applying adhesive to the tensioned elastic core by a pressure element operated by operating means to press the tensioned elastic core against an adhesive applying element, said adhesive applying means comprising upper and lower adhesive applying elements spaced a short distance from opposite sides of the tensioned elastic core, an upper presser element opposed to the upper adhesive applying element and at that side of the tensioned elastic core opposite to the upper adhesive applying element, and a lower pressure element opposed to the lower adhesive applying element and on that side of the tensioned elastic core opposite to the lower adhesive applying element, said pressure elements being operated by said operating means for the upper presser element to press the tensioned elastic core in one direction against the upper adhesive applying element and for the lower presser element to press the tensioned elastic core in the opposite direction against the lower adhesive applying element.

2. Apparatus as claimed in claim 1, and further comprising an upper stationary guide plate adjacently positioned under the upper adhesive applying element at the one side of the tensioned elastic core, a lower stationary guide plate closely positioned under the lower adhesive applying element at the other side of the tensioned elastic core, said presser elements comprising an upper tappet plate having a bevelled edge at an adjacent level above the upper stationary guide plate, said upper tappet plate being operated by said operating means to temporarily form in the tensioned elastic core a kink thereof which is pressed in the one direction against the upper adhesive applying element, and a lower tappet plate having a bevelled edge at an adjacent level above the lower stationary guide plate whereby the lower tappet plate temporarily forms in the elastic core a kink thereof which is pressed in the opposite direction against the lower adhesive applying element.

3. Apparatus for the production of composite elastic banding comprising in combination, means for continuously feeding a tensioned elastic core, means for continuously feeding a textile covering strip in flat form behind the tensioned elastic core, means for drawing off the tensioned elastic core and the textile covering strip with the margins of the latter predisposed in a manner folded over the tensioned elastic core, and means for commencing folding of the textile covering strip about the tensioned elastic core comprising a roller disposed under the textile covering strip and tensioned elastic core to change the direction of travel of the textile covering strip and tensioned elastic core.

4. Apparatus as claimed in claim 3, and having associated with said roller side walls at the sides of the folded textile covering strip, and finger elements over the folded margins of the textile covering strip to assist in the folding.

5. Apparatus for the production of composite elastic banding comprising in combination, means for continuously feeding a tensioned elastic core in an upward direction, means for continuously feeding a textile covering strip in flat form behind the tensioned elastic core and folded about a tensioned elastic core, means for drawing off the textile covering strip and the tensioned elastic core with margins of the textile covering strip predisposed in a manner folded over the tensioned elastic core, means for applying adhesive to opposite sides of the tensioned elastic core comprising an adhesive applying element at one side of the tensioned elastic core, a presser element opposed to the adhesive applying element and at that side of the tensioned elastic core opposite to the adhesive applying element, and means for operating the presser element to press the tensioned elastic core against the adhesive applying element, and a guide roller disposed under the textile covering strip and tensioned elastic core to change the direction of the textile covering strip and tensioned elastic core to commence the folding of the margins of the textile covering strip over the tensioned elastic core.

References Cited in the file of this patent

UNITED STATES PATENTS

| | | |
|---|---|---|
| 1,802,097 | Wagenfeld | Apr. 21, 1931 |
| 1,898,360 | Gioiosa | Feb. 21, 1933 |
| 2,074,580 | Fourness et al. | Mar. 23, 1937 |
| 2,366,130 | Slavek | Dec. 26, 1944 |
| 2,368,445 | Brandt | Jan. 30, 1945 |
| 2,494,176 | Howard | Jan. 10, 1950 |
| 2,674,974 | Gwinn et al. | Apr. 13, 1954 |
| 2,704,106 | Doyle et al. | Mar. 15, 1955 |
| 2,816,595 | Hudak | Dec. 17, 1957 |
| 2,995,481 | Muller | Aug. 8, 1961 |